(12) United States Patent
Hansen et al.

(10) Patent No.: US 10,706,026 B1
(45) Date of Patent: Jul. 7, 2020

(54) SELECTIVE PURGING OF DATA ATTRIBUTES

(71) Applicant: Workday, Inc., Pleasanton, CA (US)

(72) Inventors: Kathy Hansen, Clayton, CA (US); Ken Pugsley, Kansas City, MO (US); Jasmine Schladen, Fremont, CA (US); Jonathan Walsh, Dublin, CA (US)

(73) Assignee: Workday, Inc., Pleasanton, CA (US)

(*) Notice: Subject to any disclaimer, the term of this patent is extended or adjusted under 35 U.S.C. 154(b) by 242 days.

(21) Appl. No.: 14/869,668

(22) Filed: Sep. 29, 2015

(51) Int. Cl.
*G06F 7/00* (2006.01)
*G06F 16/215* (2019.01)
*G06F 3/0484* (2013.01)
*G06F 16/23* (2019.01)

(52) U.S. Cl.
CPC ........ *G06F 16/215* (2019.01); *G06F 3/04842* (2013.01); *G06F 16/235* (2019.01); *G06F 16/2365* (2019.01)

(58) Field of Classification Search
CPC ............. G06F 17/30554; G06F 16/215; G06F 16/235; G06F 16/2365; G06Q 10/06
USPC ................. 707/603, 769, 792, 692
See application file for complete search history.

(56) References Cited

U.S. PATENT DOCUMENTS

| | | | |
|---|---|---|---|
| 7,111,057 B1* | 9/2006 | Sherman | G06F 17/3089 707/999.01 |
| 7,774,314 B1* | 8/2010 | Chai | G06F 11/1469 707/640 |
| 2006/0010416 A1* | 1/2006 | Keck | G06F 17/30554 716/51 |
| 2006/0059453 A1* | 3/2006 | Kuck | G06F 12/0253 717/100 |
| 2009/0063393 A1* | 3/2009 | Saake | G06F 17/30073 |
| 2014/0052689 A1* | 2/2014 | Ficara | G06F 17/30174 707/610 |

* cited by examiner

*Primary Examiner* — Md I Uddin
(74) *Attorney, Agent, or Firm* — Van Pelt, Yi & James LLP

(57) ABSTRACT

A system for selective purging includes an interface and a processor. The interface is to receive a selection of one or more data types for selective purging. The processor is to walk through a data audit memory; and to selectively remove data based at least in part on the one or more data types.

18 Claims, 15 Drawing Sheets

Edit Custom Report

| Report Name | * | Purge Example |
|---|---|---|
| Report Type | | Advanced |
| Data Source | * | All Active and Terminated W... |
| Data Source Type | | Standard |
| Primary Business Object | | Worker |

Report Tags: Search ×Purge

⊙ Additional Info

| Columns | Sort | Filter | Subfilter | Prompts | Output | Share | Advanced |
|---|---|---|---|---|---|---|---|

6 Items

| | Order | *Business Object | Field | Column Heading Override | Format |
|---|---|---|---|---|---|
| ⊕ | | | | | |
| ⊕ ⊖ | ▶▶ | Worker | Worker | | |
| ⊕ ⊖ | ▲▶ | Worker | Terminated | | |
| ⊕ ⊖ | ▲▶ | Worker | Primary Work Address - Country | | |
| ⊕ ⊖ | ▲▶ | Worker | Termination Date | | |
| ⊕ ⊖ | ▲▶ | Worker | Date of Birth | | |
| ⊕ ⊖ | ▲▲ | Worker | Worker Documents | | |

FIG. 5

| Columns | Sort | Filter | Prompts | Output | share | Advanced |
|---------|------|--------|---------|--------|-------|----------|

Specify the filter condition that should be used for the report

3 Items

| And/Or | ( | Field | Operater | Comparision Type | Comparision Value | ) |
|--------|---|-------|----------|------------------|-------------------|---|
| And | | Terminated (based on report date) | equal to | Value specified in this filter | Yes | |
| And | | Termination Date | Less than or equal to | Value from another field | Yesterday | |
| And | | Location Address- Country | in the selection list | valve specified in this filter | France | |

Condition as Text   Terminated (based on report date) equal to Y AND Termination Date less than or equal to Yesterday AND Location Address - Country in the selection list France

FIG. 6

Purge Example 10 items

| Worker | Terminated (based on report date) | Primary Work Address - Country | Termination Date | Date of Birth | Worker Documents |
|---|---|---|---|---|---|
| Andre Gurode [C] | Yes | France | 07/31/2013 | 03/16/1984 | |
| Andre Johnson | Yes | France | 01/01/2015 | 10/03/1968 | ☐DA Roadmap.jpg |
| Arthur Robert | Yes | France | 05/20/2013 | 07/03/1972 | |
| Claude Bonnet | Yes | France | 05/31/2013 | 02/12/1991 | |
| Claude Marseille | Yes | France | 05/31/2013 | 09/03/1959 | |
| Jean-Claude Keller | Yes | France | 05/10/2013 | 05/30/1977 | |
| Liliane Bonnet | Yes | France | 05/20/2013 | 01/13/1981 | |
| Marie Claude | Yes | France | 05/31/2013 | 04/27/1989 | |
| Marion Charles | Yes | France | 06/22/2013 | 11/06/1973 | |
| Pierre Robles [C] | Yes | France | 05/30/2013 | 08/01/1995 | |

FIG. 7

Select Privacy Data To Purge

Population to Purge (Report Definition) Purge Terminees

View report on selected population 24 items

| Purgeable Data Type | Select | Area | Data to be Purged |
|---|---|---|---|
| 🔍 | ☑ | Absence | Comments and attachments for Time off Requests and Leave Requests that are not directly attached to the event |
| 🔍 | ☑ | Benefits | Purges Worker's Dependents, Beneficiaries, Wellness, and Tobacco Data |
| 🔍 | ☑ | Compensation | Merit statements and merit, bonus, and stock notes. |
| 🔍 | ☑ | Compensation | Additional compensation data including allowances, base pay, commission, stock, and bonuses |
| 🔍 | ☑ | Contact Information | Purges the ~Worker's~ Contact Information and related events |
| 🔍 | ☑ | Date of Birth and Age | Person's Date of Birth and Age data |
| 🔍 | ☑ | Ethnicity | Person's Ethnicity data |
| 🔍 | ☑ | Event Data | Events' Comments, Uploaded Documents, Attachments and Delivered Reports |

FIG. 8

Purge Person Data Comple

⊘ Purge Person Data completed successfully. 8 instances were selected for purge.

⊙ People with data Successfully Purged

People with data Successfully Purged  Purged Person (Terminated)
Purged Person (Terminated)
Purged Person (Terminated)
Purged Person (Terminated)
Purged Person (Terminated)
Purged Person (Terminated)
Purged Person (Terminated)
Purged Person (Terminated)

Data Purged
19 items

| Purgeable Data Type | Area | Data to be Purged |
|---|---|---|
| ⋯ | Absence | Comments and attachments for Time off Requests and Leave Requests that are not directly attached to the event |
| ⋯ | Benefits | Purges Worker's Dependents, Beneficiaries, Wellness, and Tobacco Data |
| ⋯ | Compensation | Merit statements and merit, bonus, and stock notes. |
| ⋯ | Compensation | Additional compensation data including allowances, base pay, commission, stock, and bonuses. |
| ⋯ | Contact Information | Purges the ~Worker's~ Contact Information and related events |
| ⋯ | Date of Birth and Age | Person's Date of Birth and Age data |

FIG. 9

Purge Example

10 items

| Worker | Terminated (based on report date) | Primary Work Address - Country | Termination Date | Date of Birth | Worker Documents |
|---|---|---|---|---|---|
| Andre Gurode [C] | Yes | France | 07/31/2013 | 03/16/1984 | |
| Purged Person | Yes | France | 01/01/2015 | | |
| Purged Person | Yes | France | 05/20/2013 | | |
| Purged Person | Yes | France | 05/31/2013 | | |
| Purged Person | Yes | France | 05/20/2013 | | |
| Purged Person | Yes | France | 05/31/2013 | | |
| Purged Person | Yes | France | 05/31/2013 | | |
| Purged Person | Yes | France | 05/10/2013 | | |
| Purged Person | Yes | France | 06/22/2013 | | |
| Purged Person | Yes | France | 05/30/2013 | | |

FIG. 10

Activity (9)

Betty Liu — 5 Years ago
✓ Provide Manager Review Comments: Step Completed

Purged Person — 5 Years ago
✓ Provide ~Employee~ Review Comments: Step Completed

Logan McNeil — 5 Years ago
✓ Complete Manager Evaluation for Performance Review: Approved

Betty Liu — 5 Years ago
✓ Complete Manager Evaluation: Step Completed

Betty Liu — 5 Years ago
✓ Approval by Manager: Approved

Purged Person — 5 Years ago
✓ Complete Self Evaluation: Step Completed

Betty Liu — 5 Years ago
✓ Set Review Content: Step Completed

Purged Person — 5 Years ago
✓ Set Review Content: Step Completed

Logan McNeil — 5 Years ago
✓ Start Performance Review: Step Completed

SELECTIVE PURGING OF DATA ATTRIBUTES

BACKGROUND OF THE INVENTION

Database systems that contain personally identifiable information or other types of specialized data may be required to be purged because of regulations, company policies, or for other reasons. One simple solution for purging is to remove the entire database entry associated with the records or other types of specialized data. However, this crude removal can damage database integrity and impair the usefulness of the database. For example, records or other types of specialized data may be referenced by other records that may include human resource, corporate, financial, and/ or other records. Upon removal of the database entry, the references between records, which constitute database integrity, can no longer be used compromising an important element of database utility.

BRIEF DESCRIPTION OF THE DRAWINGS

Various embodiments of the invention are disclosed in the following detailed description and the accompanying drawings.

FIG. 5 is a diagram illustrating an embodiment of a display of a user interface for editing a custom report for a report generator.

FIG. 6 is a diagram illustrating an embodiment of a display of a user interface for editing a custom report for a report generator.

FIG. 7 is a diagram illustrating an embodiment of a display of a system that displays a report from a data source.

FIG. 8 is a diagram illustrating an embodiment of a system using checkboxes to configure a selective purging of data attributes.

FIG. 9 is a diagram illustrating an embodiment of a display of a system for selectively purging of data attributes from a data source.

FIG. 10 is a diagram illustrating an embodiment of a display of a system that displays a report from a data source.

FIG. 11 is a diagram illustrating an embodiment of a display of a system that displays a report with selectively purged data attributes.

DETAILED DESCRIPTION

Figure 1:
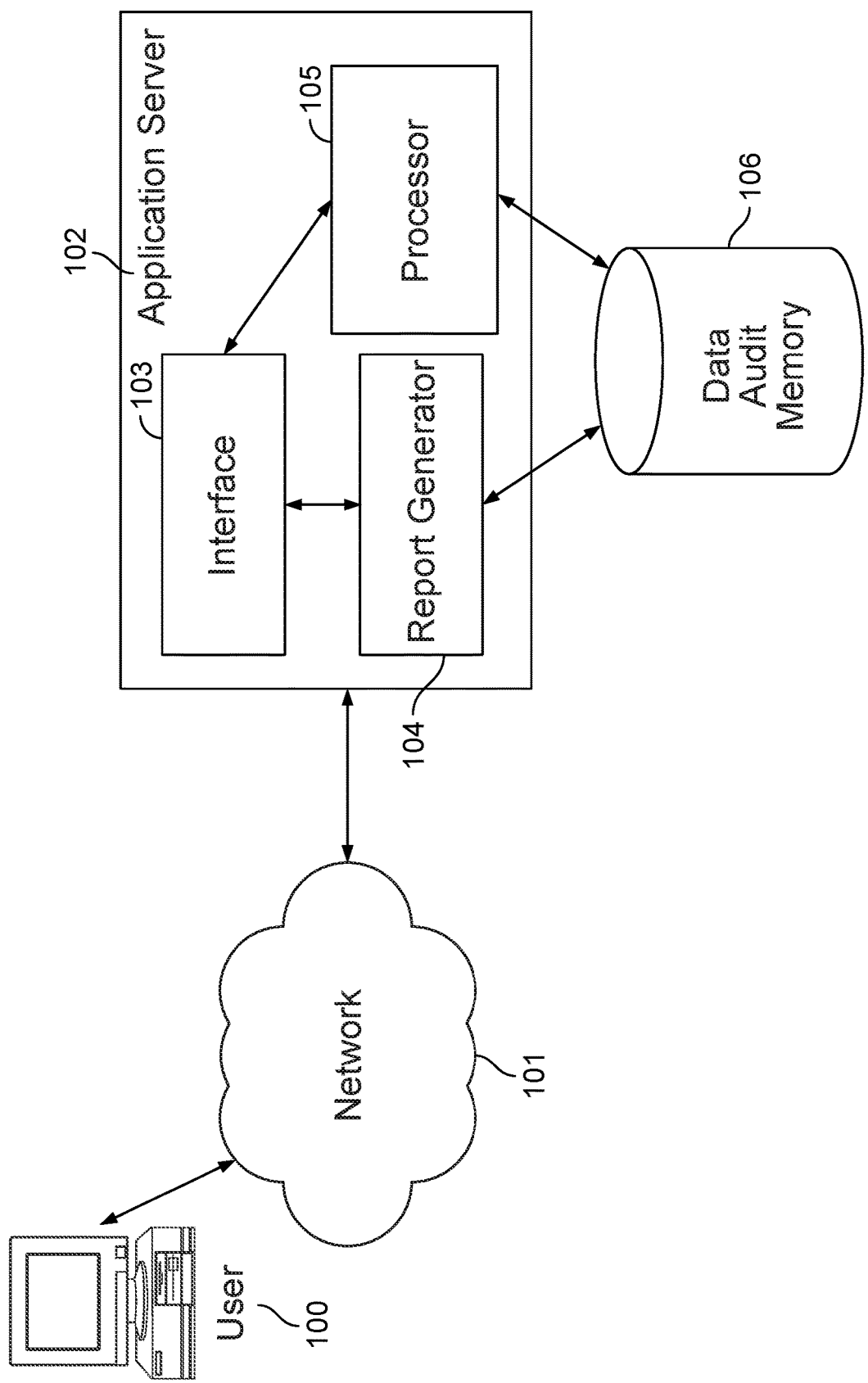
FIG. 1 is a block diagram illustrating an embodiment of a system for selective purging of data attributes.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for selective purging is disclosed. The system comprises an interface and a processor. The interface is to receive a selection of one or more data types for selective purging. The processor is to walk through a data audit memory and selectively remove data based at least in part on the one or more data types. In some embodiments, the system comprises a memory coupled to the processor and configured to provide the processor with instructions.

In some embodiments, a system for the selective purging of data attributes is disclosed. In some embodiments, data records are collections of data attributes. In various embodiments, data records comprise records with personally identifiable information, personnel records, computer records, financial records, payroll records, related data records, or any other appropriate data record. In various embodiments, data records are stored in a data audit memory, which is part of a computer system, human resource system, payroll system, financial system, relation management system, or any other appropriate data audit memory. Database integrity relies on links between related data records in a data audit memory. For example, a payroll record is linked to a personnel record. Without this collection of links database integrity is compromised as records are not able to find their related records.

In some embodiments, removing records from the database in order to remove sensitive data (e.g., required removal of personal data upon termination) breaks links between records and/or objects of the database. For example, on termination of an employee, in the event that the entire employee record is removed, then a count of employees prior to the termination would not include the deleted employee's record. Similarly, it is not possible to determine whether an employee review was performed in the years prior to termination. In contrast, selectively deleting data attributes from data records leaves the data record undeleted with links in place, thereby maintaining database integrity of the data audit memory and providing a more efficient computer system. So, for example, the name of the employee or the comments of a performance review are removed, but the presence of an employee or the fact of having done a performance review is not removed, enabling functionality of the database to be maintained.

In some embodiments, personnel records are one example of data records that include data attributes describing information about individuals. In various embodiments, data attributes describing information about individuals comprise name, date of birth, social security number, marital status, hiring date, termination date, and any other appropriate data attribute. Data attributes on personnel records may be required to be purged for a number of reasons, including regulations, company policies, or other reasons. However, other data attributes on personnel records are allowed to be retained. For example, hiring date and termination date are able to be retained, while name and social security number are required to be purged.

In some embodiments, it is determined whether the requestor is permitted to access the data audit memory. In some embodiments, the determination of whether the requestor is permitted to access the data audit memory is performed in real-time. In some embodiments, access permissions are determined by determining all of the permission types associated with the requestor. In various embodiments, permission types are determined by using one or more rules to examine data audit memory associated with the requestor where the one or more rules derive(s) roles based at least in part on the data audit memory and wherein the roles have associated permission types, by using one or more rules to examine data audit memory associated with the requestor where the one or more rules derive(s) role permissions based at least in part on the data audit memory, or by any other appropriate way of determining permission types. A report listing data records from the data audit memory is generated, matching the requestor's criteria. The requestor then selects data attributes to be purged from the data records listed in the report. The processor purges the selected data attributes from each data record listed in the report. In some embodiments, certain data attributes are replaced with placeholder data. For example, when the data record is a personnel record, the data attribute containing the name of the person may be replaced with "Purged Person".

In some embodiments, the system for purging comprises creating a purge capability and executing a purge capability. In various embodiments, creating a purge capability comprises one or more of the following: authorizing a developer to develop a purge task, authorizing a developer to access data for purging, authorize a task to have purging capability, authorize a data class to be purgeable, authorizing a data of an object of the data class to be purgeable, register purgeable data in groups for purge selection, defining exceptions to being purgeable, or any other appropriate step. For example, developing a purging capability includes: 1) gathering requirements of what needs to be purged; 2) indicating that the class has data that is subject to purging by making it subclass of applications privacy purgeable; 3) on the class, indicating which instances, relationships, and attributes of the class in particular are purgeable; 4) running the task to create a purgeable data type wherein the developer additionally adds user-facing documentation as to the category name for the types of data deleted and specifies conditions and business logic that must be met before the instance, relationship, or attribute can be purged; and 5) testing the purgeable data type to make sure that it behaves as expected.

In some embodiments, executing a purge capability comprises receiving a selection of a population that is eligible for having data to be purged and one or more data types to selectively purge, walking through the members of the population, and for each member, walking through the data types and selectively removing the data of the data types. At runtime, the removing of the data types includes a number of checks to ensure that the wrong data is not purged from the system. For example, the user that is executing the purge task is checked to determine whether the user has access to the data to be removed, the user is checked to determine whether the user has authorization to run the purging task, the data is examined to determine whether the data is the subject of an exception, it is determined whether the class of the object associated with the data is designated as purgeable, it is determined whether the data associated with an object of the purgeable class is designated as purgeable, etc. In some embodiments, a system executes a purge capability using a reporting functionality; a 'custom report' executable is setup to find the appropriate data and then purge the data. For example, in some embodiments, executing a purge capability includes: 1) configuring security as to who can execute the purge person data task; 2) creating a custom report that adheres to a set of constraints (e.g., defining of the population) that indicate it is a report eligible to be run in the purge person data task; 3) running the purge person data task, where a) the task selects a custom report from step 2); and b) the task selects the purgeable data types to purge; and c) confirms the task; and 4) a purge job is launched and purges all data selected during which a) any errors are logged during the job; and b) job history and status can be viewed using purge person data job monitor task.

In some embodiments, for a system where data is auditable and so essentially never deleted, purging data to comply with requirements of removing sensitive data can be problematic. Specifically, data is typically stored as an effective change stack and even on indicating that the data is deleted, the system stores an indication that the data is "deleted" at an effective time for deletion, however the data values are still available for effective times prior to the deletion time. However, although the system described above is valuable because important data is preserved and therefore auditable, the ability to audit data and establish data values at any point in time has a problem when there is an obligation to remove data under specific circumstances (e.g., compliance with privacy laws). Specifically, compliance with privacy laws can require specific data to be removed within specific time requirements—for example, personally identifiable information is required to be removed from records of an employee 6 months after the employee has left the workplace. On the other hand, removing data from an auditable system also poses a problem in that removing the wrong data may imperil the system's ability to audit important data. Therefore, great care must be taken to ensure that only the appropriate data is removed and that the remaining data and database functionality is preserved.

In some embodiments, checks are put in place so that the wrong data is not removed from the system. For example, checks are put in place during the creating of a purging capability and executing of a purging capability. In various embodiments, checks include:

From a developer perspective, only an authorized developer is able to develop a purging task and a developer needs to be authorized to access data;

From the task perspective, the task needs to be designated as authorized to purge;

From the data perspective, the class needs to be designated as privacy purgeable, an attribute or a relation of an instance of object belonging to a privacy purgeable class needs to be designated as purgeable, and the attribute or a relationship needs to be registered as a purgeable type so that it can be selected by a user for being purged.

In some embodiments, registration includes indicating whether the entire instance is to be purged, or whether just an attribute or selected attributes for the instance are to be purged, or whether a relationship of that instance to another instance is to be purged. Purging the relationship does not automatically purge the instances on either end of the relationship.

In some embodiments, the developer can also specify logical conditions under which the data will not be purged even if it is purgeable (e.g., an exception). For example, a terminated worker's personally identifiable information will not be purged if that worker is currently an applicant or a student.

In some embodiments, data that is allowed to be purged from the system can be verified and audited. For example, a log is stored indicating whether a report was run and the data that was indicated to be purged, the amount of data that was purged, and the amount of data that was excepted from being purged.

In some embodiments, duties for users performing the purging are segregated so that the purge is done with a two-person separation. For example, one person writes the report that is used to select the population objects with data that needs to be purged (e.g., attributes or relations that include personally identifying information of employees that were terminated that is required to be removed after the employees have left employment), then the report author shares the report with a security group or named person(s) to execute the report. That second person must be authorized to run the purge person data task, and can then select the report authored by the first person to select the population.

In various embodiments, a developer tool comprises one or more of the following: purge person data start for selecting a starting element for purging; purge person data select for selecting data type for purging; purge person data confirm for confirmation of purging; role purge person data confirm for confirming role is appropriate for purging; mark person data for purge for launching the purge job; purge person data job monitor for monitoring the purge job; view concurrent job runtime for purge person data for viewing data on a specific job runtime instance; purgeable data type for specifying the purging logic; purgeable data type for class for specifying what should be deleted from particular instances, or any other appropriate developer tools.

FIG. 1 is a block diagram illustrating an embodiment of a system for selective purging of data attributes. In the example shown, application server 102 includes interface 103, report generator 104, and processor 105. Application server 102 is coupled to data audit memory 106 so that application server 102 is able to store information and access information from data audit memory 106. Data audit memory 106 stores data records. In various embodiments, data audit memory 106 is part of a computer system, human resource system, payroll system, financial system, relationship management system, or any other appropriate data audit memory concerning personally identifiable information. Application server 102 is coupled to network 101. In various embodiments, network 101 comprises one or more of the following: a local area network, a wide area network, a wired network, a wireless network, the Internet, or any other appropriate network. Network 101 enables user 100 to connect to application server 102. In some embodiments, an application dynamically derives permissions using one or more rules by deriving the permissions in real-time from application data associated with user 100. In some embodiments, user 100 communicates with report generator 104 via network 101 and interface 103. Report generator 104 runs a report that selectively purges data attributes stored in data audit memory 106. In some embodiments, report generator 104 uses a processor to execute code for running a report. In various embodiments, the processor of report generator 104 comprises processor 105, a separate processor, a plurality of processors, or any other appropriate processor(s). In some embodiments, a memory is coupled to a processor and configured to provide the processor with instructions.

Figure 2:
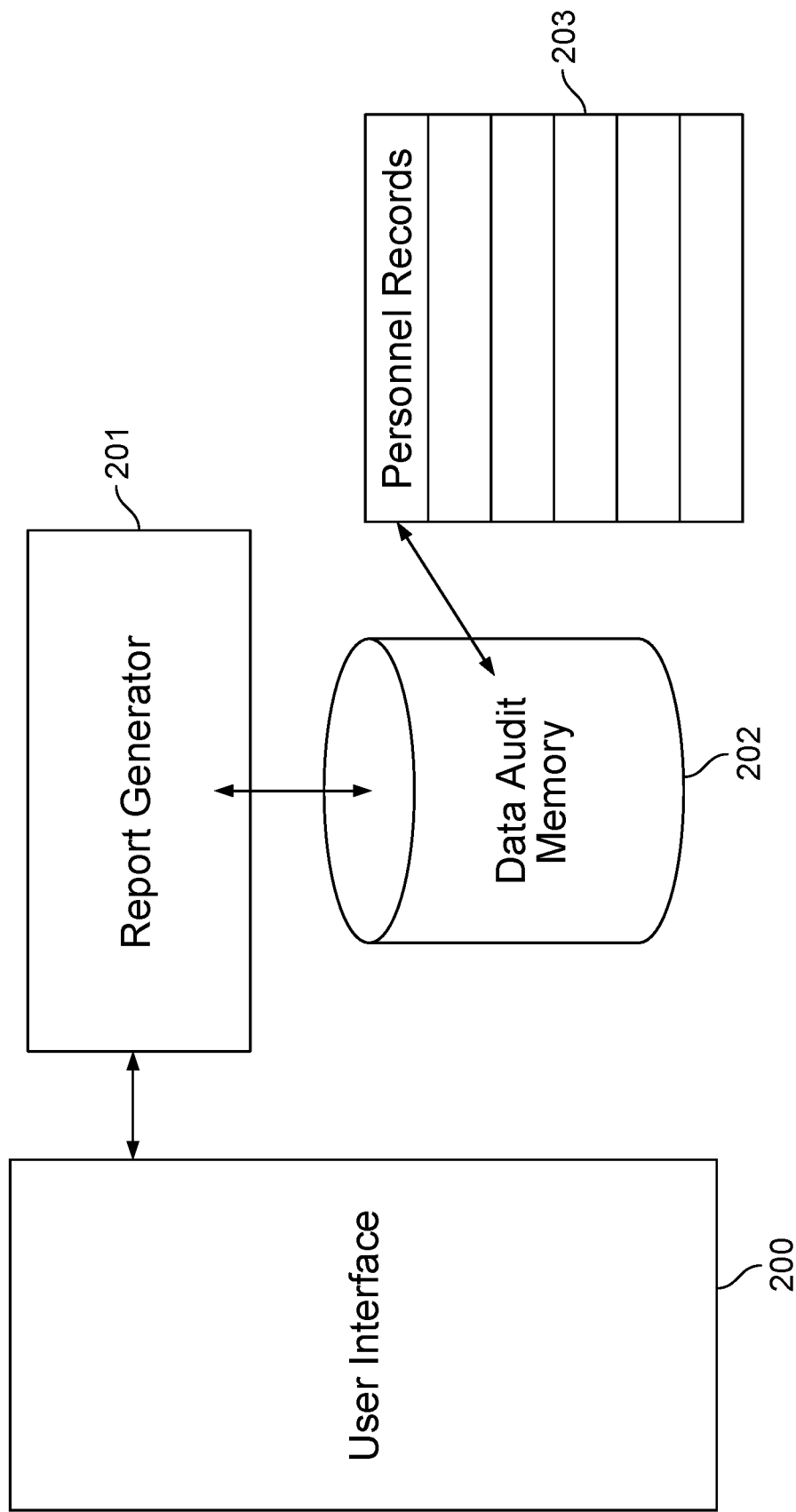
FIG. 2 is a block diagram illustrating an embodiment of a system for selective purging of data attributes.

FIG. 2 is a block diagram illustrating an embodiment of a system for selective purging of data attributes. In some embodiments, interface 103, report generator 104, and data audit memory 106 of the system of FIG. 1 comprise user interface 200, report generator 201, and data audit memory 202 of FIG. 2, respectively. In the example shown, a system user interacts with user interface 200, providing input to and receiving output from an application server. Report generator 201 is part of an application server. User interface 200 communicates with report generator 201. Report generator 201 accesses stored data in data audit memory 202 and uses that data to prepare a report according to parameters from user interface 200. Data audit memory 202 stores data records. In various embodiments, data records comprise personnel records such as personnel record 204, records with personally identifiable information, computer records, financial records, payroll records, or any other appropriate data record.

Figure 3:
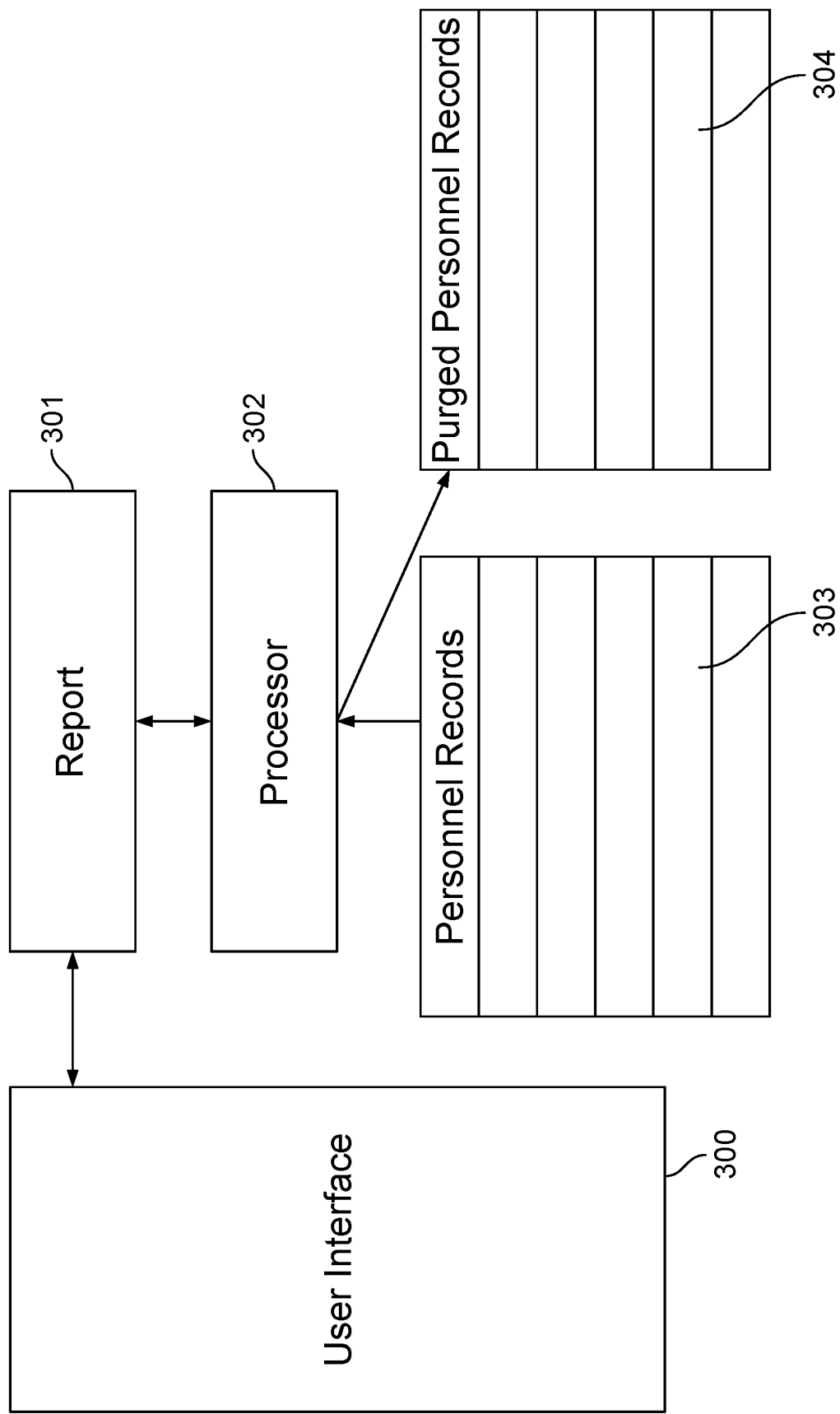
FIG. 3 is a block diagram illustrating an embodiment of a system for selective purging of data attributes.

FIG. 3 is a block diagram illustrating an embodiment of a system for selective purging of data attributes. In some embodiments, interface 103 of the system of FIG. 1 comprises user interface 300, and processor 302 is the same as processor 105 of the system of FIG. 1. In the example shown, report 301 is generated by a report generator. Processor 302 uses report 301 to selectively purge data attributes from a set of data records, such as personnel records 303. In various embodiments, data records comprise records with personally identifiable information, personnel records, computer records, financial records, payroll records, or any other appropriate data record. Processor 302 selectively purges data attributes from data records such as personnel records 303, resulting in selectively purged data records such as purged personnel records 304.

Figure 4:
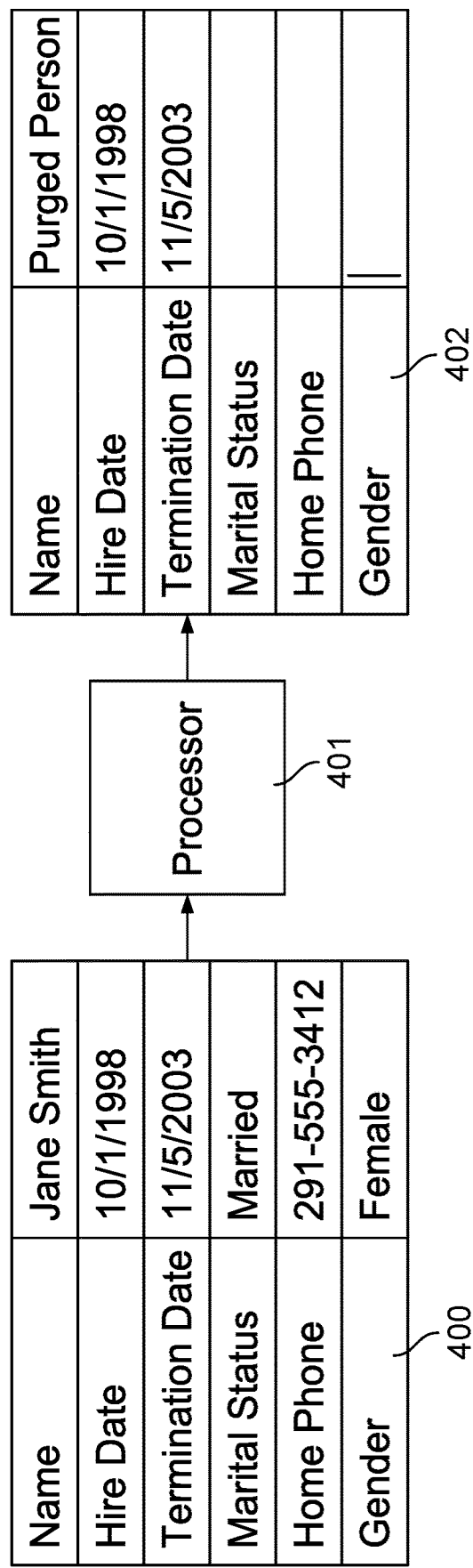
FIG. 4 is a block diagram illustrating an embodiment of a system for the selective purging of data attributes.

FIG. 4 is a block diagram illustrating an embodiment of a system for the selective purging of data attributes. In some embodiments, processor 401 comprises processor 302 of the system of FIG. 3. In the example shown, processor 401 selectively purges data attributes from a data record. In various embodiments, data records comprise personnel records such as personnel record 400, records with personally identifiable information, computer records, financial records, payroll records, or any other appropriate data record. Processor 401 produces purged data records, such as purged personnel record 402. In some embodiments, personnel record 400 is a subset of personnel records. Personnel record 400 includes name (e.g., Jane Smith), hire date (e.g., 10/1/1998), termination date (e.g., 11/5/2003), marital status (e.g., married), home phone (e.g., 291-555-3412), and gender (e.g., female). Personnel record 402 is selectively purged and after purging includes replacement for the name (e.g., purged person), hire date (e.g., 10/1/1998), and termination date (e.g., 11/5/2003), but with a purged or blank marital status, home phone, and gender as indicated in the purging rules. In some embodiments, purged personnel record 402 is a subset of purged personnel records.

FIG. 5 is a diagram illustrating an embodiment of a display of a user interface for editing a custom report for a report generator. In some embodiments, the interface of FIG. 5 is used in the process of generating a report for selectively purging data. In various embodiments, the display is used for editing and/or creation of a report, where the report is used to find the appropriate data and then to purge the data. In the example shown, the display is establishing the data columns to retrieve from a database. The display includes a report name (e.g., Purge Example), a report type (e.g., advanced), a data source (e.g., all active and terminated workers), a data source type (e.g., standard), a primary business object (e.g., worker), and a report tag (e.g., a search window, purge, etc.). The columns of the search report include a worker field of a worker object, a terminated field of a worker object, a primary work address—country field of a worker object, a termination date field of a worker object, a date of birth field of a worker object, and a worker documents field of a worker object. Additional tabs available include a column tab (shown as selected), a sort tab, a filter tab, a subfilter tab, a prompts tab, an output tab, a share tab, and an advanced tab.

FIG. 6 is a diagram illustrating an embodiment of a display of a user interface for editing a custom report for a report generator. In some embodiments, the interface of FIG. 6 is used in the process of generating a report for selectively purging data. In various embodiments, the display is used for editing and/or creation of a report, where the report is used to find the appropriate data and then purge the data. In the example shown, the display is used in defining a filter to define a population of objects whose data is to be selectively purged (e.g., a set of workers that were terminated based on a report date, where the date of termination was before Yesterday, and who were located in France). The display indicates a parameter type for a report (e.g., Filter), a list of parameters in a table, and a description of the parameters (e.g., Condition as Text). The columns of the list of parameters in a table include a boolean operator (e.g., AND, OR, etc.), a parameter group opening (e.g., "("), a parameter description, a parameter operator type (e.g., equal to, less than, greater then, etc.), a parameter comparison type, a comparison value, and a parameter group closing (e.g., ")"). The tabs available include a column tab, a sort tab, a filter tab (shown as selected), a subfilter tab, a prompts tab, an output tab, a share tab, and an advanced tab.

FIG. 7 is a diagram illustrating an embodiment of a display of a system that displays a report from a data source. In some embodiments, the display in FIG. 7 results from the inputs to the user interface for editing a custom report for a report generator depicted in FIG. 5 and FIG. 6. In some embodiments, the columns depict the data satisfying the criteria and show the population that is subject to the purging. In the example shown, the display includes a report name (e.g., Purge Example), a record count (e.g., 10 items), and a table displaying business object report data. The columns of the table displaying business object report data include a worker field of a worker object (e.g., "Andre Gurode", "Andre Johnson", "Arthur Robert", "Claude Bonnet", "Claude Marseille", "Jean-Claude Keller", "Liliane Bonnet", "Marie Claude", "Marion Charles", "Pierre Robles", etc.), terminated (based on report date)(e.g., "Yes", "No", etc.; in this case all "Yes"), a primary work address—country of a worker object (e.g., "France", "USA", etc.; in this case all "France"), a termination date field of a worker object (e.g., 7/31/2013, 1/1/2015, 5/20/2013, 5/31/2013, 5/31/2013, 5/10/2013, 5/20/2013, 5/31/2013, 6/22/2013, 5/30/2013, etc.), a date of birth field of a worker object (e.g., 3/16/1984, 10/3/1968, 7/3/1972, 2/12/1991, 9/3/1959, 5/30/1977, 1/13/1981, 4/27/1989, 11/6/1973, and 8/1/1995), and a worker documents field of a worker object (e.g., uploaded document DA Roadmap.jpg for Andre Johnson).

FIG. 8 is a diagram illustrating an embodiment of a user interface of a system using checkboxes to configure a selective purging of data attributes from data records. In some embodiments, the display of FIG. 8 is used to register data as purgeable. For example, the data associated with the population (e.g., attributes, relations, etc.) that is to be purged. In the example shown, the display includes a configuration type (e.g., Select Privacy Data to Purge), a report definition (e.g. Purge Terminees), an option to view report on selected population, a checkbox count (e.g., 24 items), and a table displaying checkboxes to configure a selective purging of data attributes from data records. The columns of the table displaying checkboxes to configure a selective purging of data attributes from data records include a purgeable data type, a select checkbox, an area specifying one or more fields of a worker object, and data to be purged describing the area specifying a field of a worker object. For example, a selected area "Absence" has data to be purged of "comments and attachments for time off requests and leave requests that are not directly attached to the event"; a selected area "Benefits" has data to be purged of "purges worker's dependents, beneficiaries, wellness, and tobacco data"; a selected area "Compensation" has data to be purged of "merit statements and merit, bonus, and stock notes"; a selected area "Compensation" has data to be purged of "additional compensation data including allowances, base pay, commission, stock, and bonuses"; a selected area "Contact Information" has data to be purged of "purges the worker's contact information and related events"; a selected area "Date of Birth and Age" has data to be purged of "person's date of birth and age data"; a selected area "Ethnicity" has data to be purged of "person's ethnicity data"; a selected area "Event Data" has data to be purged of "events comments, updated documents, attachments, and delivered reports".

FIG. 9 is a diagram illustrating an embodiment of a display of a system for selectively purging of data attributes from a data source. In the example shown, the display includes a report title (e.g., Purge Person Data Complete), a description of selective purging of data attributes (e.g., Purge Person Data completed successfully. 8 instances were selected for purge.), a list of worker objects that have undergone selective purging of data attributes (e.g., People with Data Successfully Purged), and a table describing data attributes that have been selectively purged. The columns of the table describing data attributes that have been selectively purged include purgeable data type, an area specifying one or more fields of a worker object, and a description of data to be purged from a worker object.

FIG. 10 is a diagram illustrating an embodiment of a display of a system that displays a report from a data source. In some embodiments, the display shows the data objects after selective purging—for example, the names of the workers, the dates of birth, and the worker documents have been purged. The terminated status, the country where worked, and the termination date have not. In the example shown, the display includes a report name (e.g., Purge Example), a record count (e.g., 10 items), and a table displaying business object report data. The columns of the table displaying business object report data include a worker field of a worker object, terminated (based on report date), a primary work address—country of a worker object, a termination date field of a worker object, a date of birth field of a worker object, and a worker documents field of a worker object. In the example shown, Andre Gurode has termination date of 7/31/2013 and a date of birth of 03/16/1984 and the data was not purged. Whereas all other entries have been purged and the worker name has been replaced with "Purged Person". In some embodiments, data for a terminated person was not purged (e.g., Andre Gurode—due to an exception (e.g., a person has an outstanding payment, the person is a student, the person in on leave, etc.).

FIG. 11 is a diagram illustrating an embodiment of a display of a system that displays a report with selectively purged data attributes for use in determining who was involved in a business process. In some embodiments, prior to purging, this report would have shown the name of the person involved. Subsequent to purging, the fact that there was a participant is retained so as to maintain the integrity of the business process record, but the name of that person is removed and replaced with Purged Person to mask the identity of the participant. In some embodiments, the report of FIG. 11 comprises a regular report that any user would see on a day-to-day basis, for example a detailed account of who participated in a business process. After the purge, the report is still of use, it has just been anonymized so the name of the purged person involved is masked after the purging. In the example shown, the display includes a report name (e.g. Activity), a report record count (e.g. 9), and a list of records with selectively purged data attributes. Each record with selectively purged data attributes included in the display includes a worker field of a worker object (e.g., Betty Liu, Logan McNeil, or Purged Person), a date of action taken on a worker object (e.g., 5 years ago), and a description of action taken on a worker object (e.g., Provide Manager Review Comments: Step Completed). In the example shown, a terminated worker has had their name replaced in the report output with "Purged Person". However, the step and the completion of the step are still visible for the purged person.

Figure 12A:
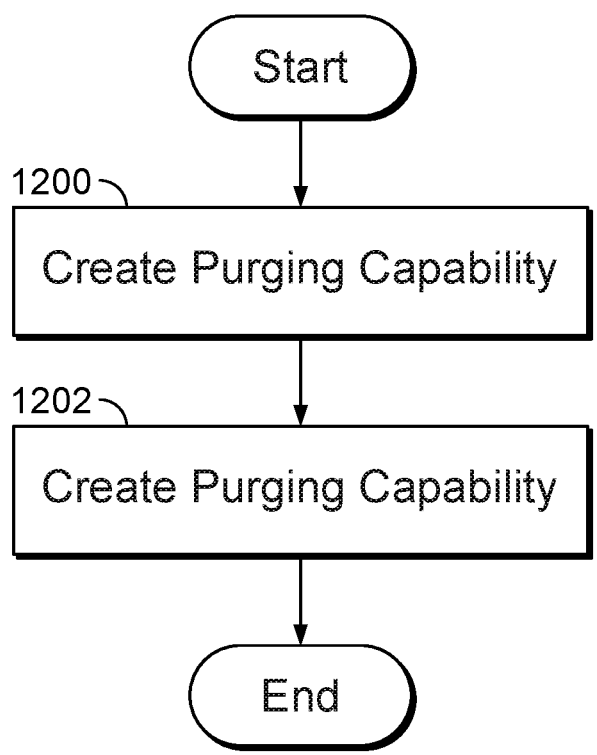
FIG. 12A is a flow diagram illustrating an embodiment of a process for selectively purging.

FIG. 12A is a flow diagram illustrating an embodiment of a process for selectively purging. In some embodiments, the process of FIG. 12A is executed using the system of FIG. 3. In the example shown, in 1200 a purge capability is created. In 1202, a purge capability is executed.

Figure 12B:
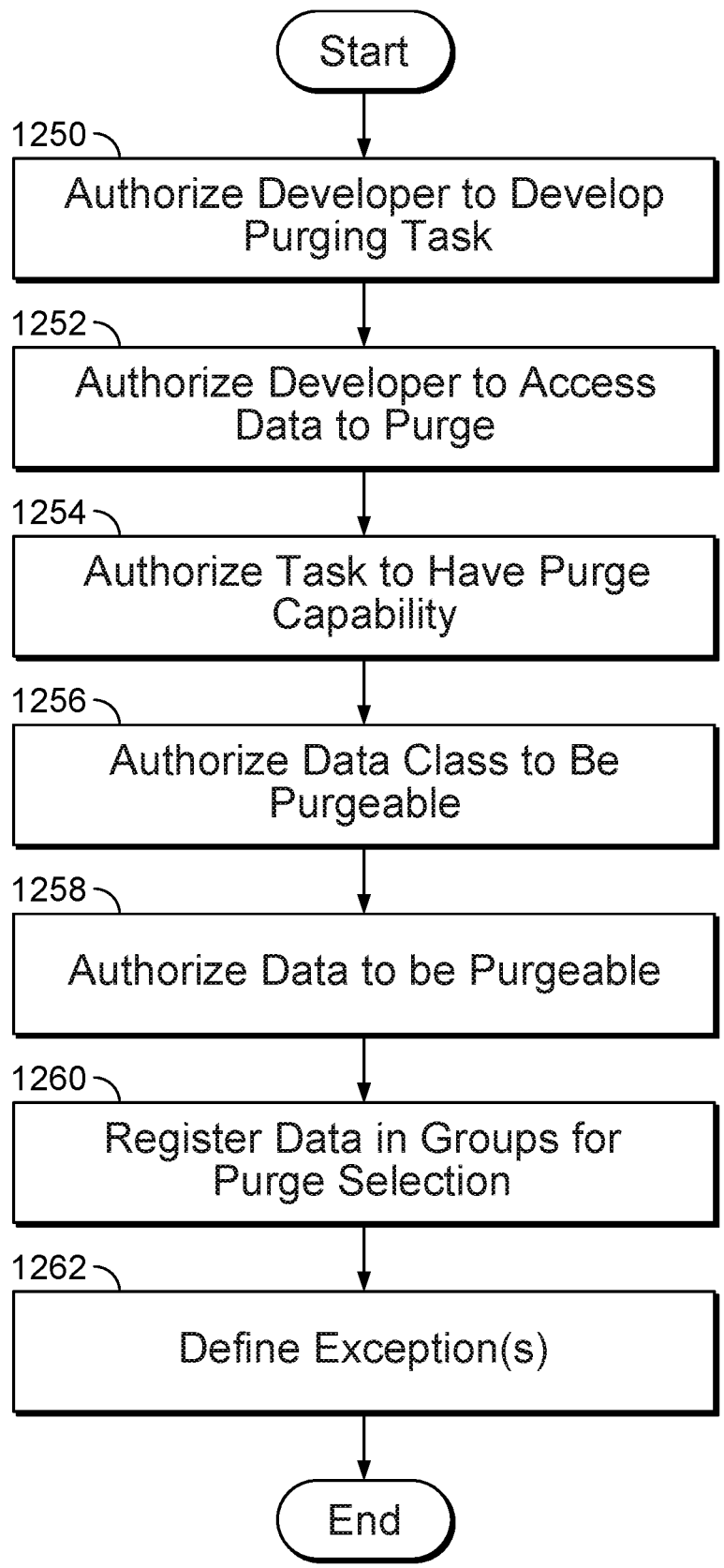
FIG. 12B is a flow diagram illustrating an embodiment of a process for creating a purging capability.

FIG. 12B is a flow diagram illustrating an embodiment of a process for creating a purging capability. In some embodiments, the process of FIG. 12B is used to implement 1200 of FIG. 12A. In the example shown, in 1250 a developer is authorized to develop a purging task. In 1252, a developer is authorized to access data to purge. In 1254, a task is authorized to have a purge capability. In 1256, a data class is authorized to be purgeable. In 1258, data is authorized to be purgeable. For example, data attributes and/or data relationships are indicated to be purgeable, where the data attributes or data relationships are of objects that are of a class that is authorized to be purgeable. In 1260, data is registered in groups for purge selection. For example, data is grouped into groups that are selectable to be purged by a user. In 1262, exceptions are defined. For example, exception conditions are defined where data is not purgeable even though all other authorizations allow purging. In some embodiments, an exception comprises a worker's personally identifiable information is not able to be purged after being terminated for 6 months in the event that there is still payment owed the worker, in the event that the worker is a student, or any other appropriate exception.

Figure 13A:
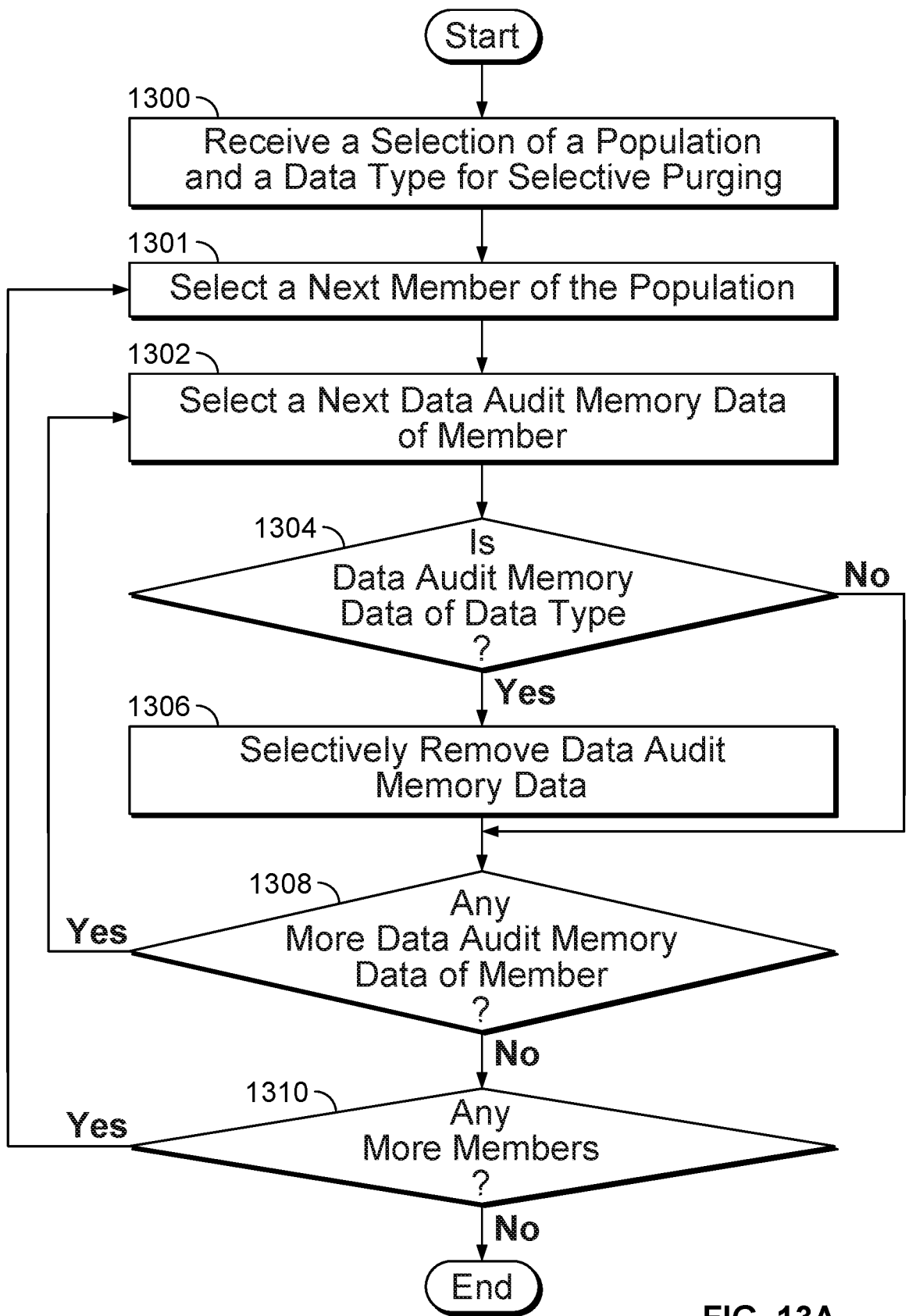
FIG. 13A is a flow diagram illustrating an embodiment of a process for selectively purging data attributes in data audit memory.

FIG. 13A is a flow diagram illustrating an embodiment of a process for selectively purging data attributes in data audit memory. In some embodiments, the process of FIG. 13A is executed using the system of FIG. 3. In the example shown, in 1300 a selection of a population and a data type for selective purging is received. For example, a selection of a data type and a population (e.g., workers in France that were terminated 6 months ago) is made using a report where a data type is indicated as needing to be selectively purged. In some embodiments, the population and the data types are selected by two separate persons in order to add an added safety measure that keeps undesired purges from occurring. In 1301, a next member of the population is selected. In 1302, a next data audit memory data of a member is selected. For example, a data (e.g., a personnel record) is selected from a data audit memory. In 1304, it is determined whether data audit memory data is of data type. For example, the data audit memory data is compared to the selected of a data type. In the event that the data audit memory data is not of the data type, control passes to 1308. In the event that data audit memory data is of data type, then in 1306, data audit memory data is selectively removed. For example, data (e.g., attributes of an object) are selectively removed. In 1308, it is determined whether there is more data audit memory data of the member. In the event that there is more data audit memory data of the member, then control passes to 1302. In the event that there is not more data audit memory data of the member, then in 1310 it is determined whether there are more members. For example, are there more members in the population to be selectively purged? In the event that there are more members, then control passes to 1301. In the event that there are not more members, then the process ends.

Figure 13B:
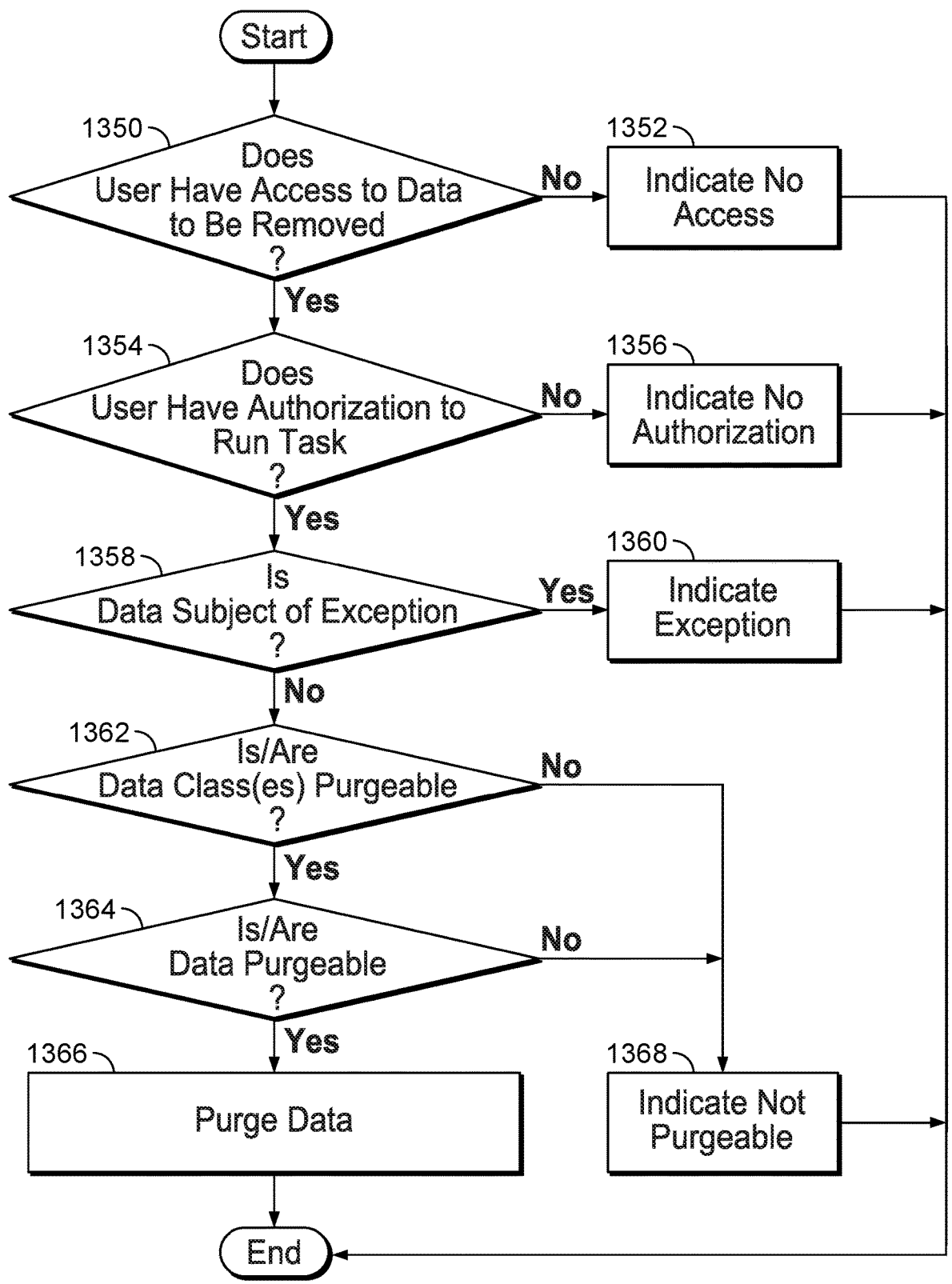
FIG. 13B is a flow diagram illustrating an embodiment of a process for determining user access to data audit memory and selectively purging data attributes in data audit memory.

FIG. 13B is a flow diagram illustrating an embodiment of a process for determining user access to data audit memory and selectively purging data attributes in data audit memory. In some embodiments, the process of FIG. 13B is executed using the system of FIG. 1. In the example shown, in 1350 it is determined whether a user has access to data to be removed. For example, a user that requests to remove data from a data audit memory. In various embodiments, the user has to have permission to access the data, to delete the data, to run a report that is able to remove data, or any other appropriate permission. In the event that a user does not have access, in 1352 it is indicated that there is no access and the process ends. For example, the user is informed that the user does not have permission to purge data. In the event that the user does have access, control passes to 1354. In 1354, it is determined whether the data is subject of an exception. For example, an application server determines whether the user has authorization to run the task. In the event that the user does not have authorization to run the task, in 1356 it is indicated that the user has no authorization, and the process ends. In the event that the user has authorization, in 1358 it is determined whether the data is subject of an exception. In the event that the data is the subject of an exception, in 1360 an exception is indicated and the process ends. In the event that the data is not a subject of an exception, in 1362 it is determined whether data class(es) are purgeable. In the event that data class(es) are not purgeable, in 1368 it is indicated that the attributes are not purgeable, and the process ends. In the event that attribute data class(es) are purgeable, in 1364 it is determined whether the data is/are purgeable, and control passes to 1364. For example, attributes stored in data audit memory are selectively removed. In 1364, it is determined whether relation(s) is/are purgeable. For example, it is determined whether an attribute or a relation is purgeable, where the attribute or relation is stored in the data audit memory associated with a class and object instance that is indicated as purgeable. In the event that relation(s) is/are not purgeable, then in 1368 it is indicated that relations are not purgeable and the process ends. In the event that relation(s) is/are purgeable, in 1366 data are purged. For example, relation(s) and/or attribute(s) of objects stored in the data audit memory is/are selectively removed and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for selective purging, comprising:
    an interface to:
        receive a selection of one or more data types for selective purging;
    a processor to:
        walk through a data audit memory;
        selectively remove data based at least in part on the one or more data types, wherein the selectively removing of the data uses a first report, wherein the data includes a set of objects, and wherein to selectively remove the data comprises to:
            determine whether the data conforms with a class of an object associated with data that is designated as purgeable, wherein the class is indicated to include data that is subject to purging, wherein the class includes which instances, relationships, and attributes of the class in particular are purgeable; and
            in response to a determination that the data conforms with the class of the object associated with data that is designated as purgeable:
                determine whether the data is designated as purgeable, comprising to:
                    determine whether the data corresponds to a purgeable data type; and
                    in response to a determination that the data corresponds to the purgeable data type, determine that the data is designated as purgeable; and
                in response to a determination that the data is designated as purgeable:
                    purge the data, wherein purge the data comprises to remove one or more attributes of one or more objects of the set of objects, wherein the purging of the data comprises to:
                        purge the data via a two-person separation;
                        replace the one or more attributes of the one or more objects of the set of objects with one or more placeholder data, wherein the one or more placeholder data masks the one or more attributes;
                        maintain a link between the one or more placeholder data and the one or more objects of the set of objects; and
                    verify the purging of the data, comprising to:
                        run a second report including the one or more placeholder data; and
            store a log indicating whether the first report was run, data that vas indicated to be purged, an amount of data that was purged, and an amount of data that was excepted from being purged.

2. The system as in claim 1, wherein receiving a selection of one or more data types comprises receiving the selection using a graphical user interface.

3. The system as in claim 2, wherein the graphical user interface includes checkboxes.

4. The system as in claim 1, wherein walking through the data audit memory comprises selecting sequentially each item in a data archive.

5. The system as in claim 1, wherein purge the data comprises to permanently remove the data from the data audit memory.

6. The system as in claim 1, wherein a user requesting execution of the report has authorization to run the report.

7. The system as in claim 1, wherein selectively removing data uses a filter to determine the set of objects associated with the selectively removing data.

8. The system as in claim 7, wherein a user requesting the execution has unconstrained access to the one or more attributes.

9. The system as in claim 7, wherein the one or more attributes have a property of being able to be purged.

10. The system as in claim 7, wherein an instance of the object is not permanently removed.

11. The system as in claim 7, wherein one or more other attributes of the object of the set of objects are not purged.

12. The system as in claim 7, wherein one or more relations of the object of the set of objects are purged.

13. The system as in claim 7, wherein it is determined whether the one or more attributes of the object of the set of objects are subject to an exception for purging.

14. The system as in claim 1, wherein the one or more data types for selective purging are optionally able to be purged.

15. The system as in claim 1, wherein the data type for selective purging is not optionally able to be purged.

16. The system as in claim 1, wherein verify the purging of the data comprises to generate a report output, wherein the report output includes the one or more placeholder data.

17. A method for selective purging, comprising:
    receiving a selection of a data type for selective purging;
    walking through, using a processor, a data audit memory;
    selectively removing data based at least in part on the data types, wherein the selectively removing of the data uses a first report, wherein the data includes a set of objects, and wherein the selectively removing of the data comprises:
        determining whether the data conforms with a class of an object associated with data that is designated as purgeable, wherein the class is indicated to include data that is subject to purging, wherein the class includes which instances, relationships, and attributes of the class in particular are purgeable; and
        in response to a determination that the data conforms with the class of the object associated with data that is designated as purgeable:
            determining whether the data is designated as purgeable, comprising:
                determining whether the data corresponds to a purgeable data type; and
                in response to a determination that the data corresponds to the purgeable data type, determining that the data is designated as purgeable; and
            in response to a determination that the data is designated as purgeable:
                purging the data, wherein purging the data comprises removing one or more attributes of one or more objects of the set of objects, wherein the purging of the data comprises:

purging the data via a two-person separation;
replacing the one or more attributes of the one or more objects of the set of objects with one or more placeholder data, wherein the one or more placeholder data masks the one or more attributes;
maintaining a link between the one or more placeholder data and the one or more objects of the set of objects; and
verifying the purging of the data, comprising:
running a second report including the one or placeholder data; and
storing a log indicating whether the first report was run, data that was indicated to be purged, an amount of data that was purged, and an amount of data that was excepted from being purged.

18. A computer program product for selective purging, the computer program product being embodied in a non-transitory computer readable storage medium and comprising computer instructions for:
receiving a selection of a data type for selective purging;
walking through, using a processor, a data audit memory;
selectively removing data based at least in part on the data types, wherein the selectively removing of the data uses a first report, wherein the data includes a set of objects, and wherein the selectively removing of the data comprises:
determining whether the data conforms with a class of an object associated with data that is designated as purgeable, wherein the class is indicated to include data that is subject to purging, wherein the class includes which instances, relationships, and attributes of the class in particular are purgeable; and
in response to a determination that the data conforms with the class of the object associated with data that is designated as purgeable:
determining whether the data is designated as purgeable, comprising:
determining whether the data corresponds to a purgeable data type; and
in response to a determination that the data corresponds to the purgeable data type, determining that the data is designated as purgeable; and
in response to a determination that the data is designated as purgeable:
purging the data, wherein purging the data comprises removing one or more attributes of one or more objects of the set of objects, wherein the purging of the data comprises:
purging the data via a two-person separation;
replacing the one or more attributes of the one or more objects of the set of objects with one or more placeholder data, wherein the one or more placeholder data masks the one or more attributes;
maintaining a link between the one or more placeholder data and the one or more objects of the set of objects; and
verifying the purging of the data, comprising:
running a second report including the one or more placeholder data; and
storing a log indicating whether the first report was run, data that was indicated to be purged, an amount of data that s purged, and an amount of data that was excepted from being purged.

* * * * *

UNITED STATES PATENT AND TRADEMARK OFFICE
CERTIFICATE OF CORRECTION

PATENT NO. : 10,706,026 B1
APPLICATION NO. : 14/869668
DATED : July 7, 2020
INVENTOR(S) : Kathy Hansen et al.

Page 1 of 1

It is certified that error appears in the above-identified patent and that said Letters Patent is hereby corrected as shown below:

On the Drawings

In drawing sheet(s) 9 of 15, figure 9, Line 1, delete "comple" and insert --complete--, therefor.

In the Claims

In Column 13, Line(s) 11, Claim 17, after "one or", insert --more--.

In Column 14, Line(s) 31, Claim 18, before "purged", delete "s" and insert --was--, therefor.

Signed and Sealed this
Twenty-second Day of December, 2020

Andrei Iancu
*Director of the United States Patent and Trademark Office*